(12) United States Patent
Spears

(10) Patent No.: US 8,297,663 B2
(45) Date of Patent: Oct. 30, 2012

(54) ROTATABLE FIRE SPRINKLER FITTING WITH ELONGATED GASKET

(75) Inventor: Wayne Spears, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 48 days.

(21) Appl. No.: 12/536,654

(22) Filed: Aug. 6, 2009

(65) Prior Publication Data

US 2011/0031746 A1   Feb. 10, 2011

Related U.S. Application Data

(63) Continuation of application No. 12/418,745, filed on Apr. 6, 2009, now abandoned.

(51) Int. Cl.
*F16L 19/00* (2006.01)
(52) U.S. Cl. ....................................................... 285/355
(58) Field of Classification Search .................... 285/355
See application file for complete search history.

(56) References Cited

U.S. PATENT DOCUMENTS

| | | | |
|---|---|---|---|
| 1,233,644 A | | 7/1917 | Clark |
| 1,368,196 A | * | 2/1921 | Peck .............................. 285/349 |
| 1,681,470 A | | 8/1928 | Drees |
| 2,399,275 A | * | 4/1946 | Wenk ............................ 285/356 |
| 2,712,457 A | | 7/1955 | Kimbro |
| 2,968,440 A | * | 1/1961 | Cone ............................. 285/355 |
| 3,100,656 A | * | 8/1963 | MacArthur ................... 285/350 |
| 3,489,441 A | * | 1/1970 | Malcolm ....................... 285/379 |
| 4,073,513 A | * | 2/1978 | Blakeley ....................... 285/355 |
| 4,296,954 A | * | 10/1981 | Fujimaki et al. ............... 285/355 |
| 4,570,983 A | * | 2/1986 | Olenfalk et al. .............. 285/355 |
| 4,682,797 A | * | 7/1987 | Hildner ........................ 285/355 |
| 5,149,144 A | * | 9/1992 | Blakeley ....................... 285/330 |
| 5,286,001 A | | 2/1994 | Rafeld |
| 5,775,378 A | | 7/1998 | Auvil et al. |
| 6,039,120 A | * | 3/2000 | Wilkins et al. ................ 285/355 |
| 6,540,261 B1 | | 4/2003 | Painter et al. |
| 6,565,124 B2 | * | 5/2003 | Mosse ........................... 285/354 |
| 7,055,865 B2 | * | 6/2006 | Riordan et al. ............... 285/355 |
| 2002/0185282 A1 | | 12/2002 | Kretschmer |

(Continued)

FOREIGN PATENT DOCUMENTS

KR   20-1998-0038400   9/1998

(Continued)

OTHER PUBLICATIONS

International Search Report and Written Opinion dated Jan. 31, 2011 in PCT/US2010/030050.

(Continued)

*Primary Examiner* — David E Bochna
(74) *Attorney, Agent, or Firm* — Denton L. Anderson; Sheldon Mak & Anderson PC

(57) ABSTRACT

A pipe fitting, useable in the installation of a sprinkler head, includes (a) a body having an open upstream end and an open downstream end, the downstream end having internal threads capable of accepting a threaded male fitting, the body defining a gasket retention area located upstream of the internal threads; and (b) an gasket disposed within the gasket retention area. The gasket retention area and the gasket are chosen so that a threaded male fitting threadedly disposed within the downstream end of the body can be rotated within the downstream end of the body 360° while remaining liquid tight for pressures in excess of 300 psig.

11 Claims, 3 Drawing Sheets

U.S. PATENT DOCUMENTS

2006/0225895 A1 10/2006 Grant
2008/0012327 A1* 1/2008 Spears .................. 285/355

FOREIGN PATENT DOCUMENTS

| KR | 20-0335463 | 12/2003 |
|---|---|---|
| KR | 20-0365477 | 10/2004 |
| KR | 20-0391276 | 8/2005 |
| KR | 10-2007-0049269 | 5/2007 |

OTHER PUBLICATIONS

International Preliminary Report on Patentability, dated Nov. 28, 2011, in International Application No. PCT/US2010/030050.

* cited by examiner

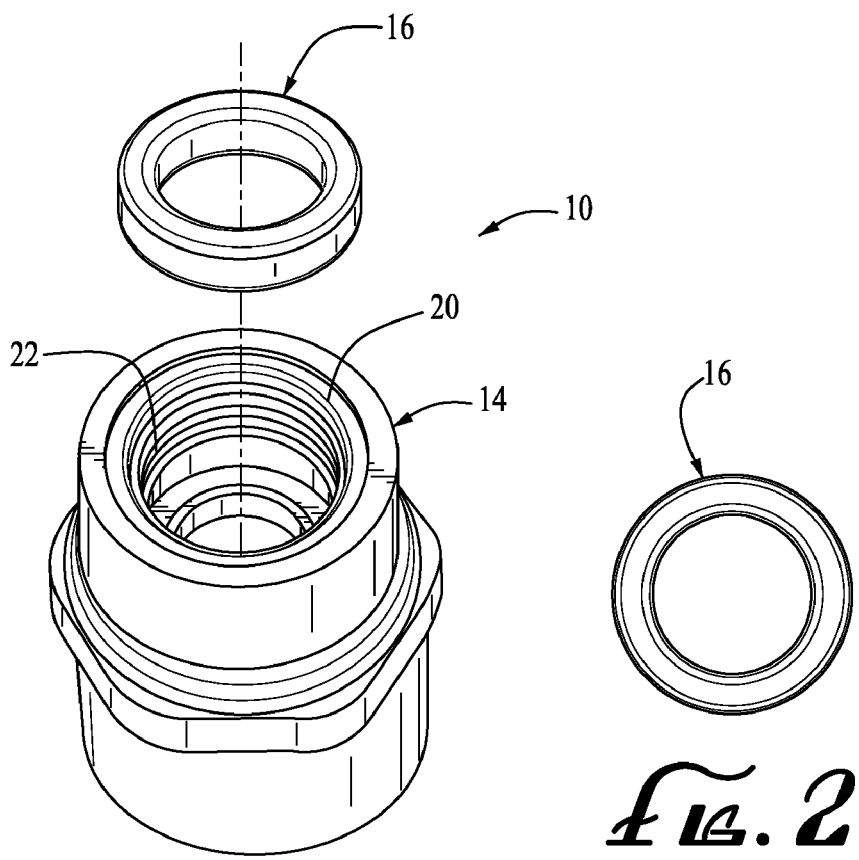
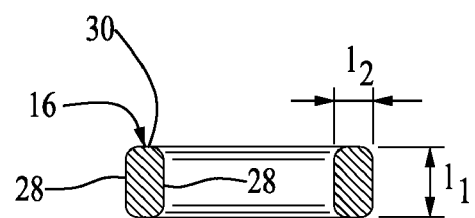
fig.1
fig.2
fig.3

ROTATABLE FIRE SPRINKLER FITTING WITH ELONGATED GASKET

RELATED APPLICATION

This application is a continuation of U.S. patent application Ser. No. 12/418,745, filed on Apr. 6, 2009, entitled ROTATABLE FIRE SPRINKLER FITTING WITH ELONGATED GASKET, the entirety of which is incorporated herein by reference.

FIELD OF THE INVENTION

This invention relates generally to pipe fittings and, more specifically, to pipe fittings used to install fire sprinkler systems.

BACKGROUND OF THE INVENTION

Fire sprinkler systems are increasingly recognized as necessary safety features in the construction of new buildings and in the upgrading of existing buildings. There is a problem, however, in the installation of fire sprinkler systems.

Many styles of fire sprinkler heads have built-in deflectors that require rotational orientation of the sprinkler head to correctly position the deflector to produce the desired spray pattern when the head operates. All prior art fire sprinkler heads are attached to the piping mains by tapered pipe threads designed to produce a water tight seal using the interference of the tapered threads, plus either or both of a thread tape or thread paste. Thus, it can be appreciated that proper orientation of prior art sprinkler heads can usually only be accomplished by under-tightening the sprinkler heads or over-tightening the sprinkler heads. Overtightening of the tapered pipe threads produces interference between the mating threads, resulting in distortion of the mating parts. Undertightening over the tapered pipe threads can produced leaks.

Accordingly, there is a need for a fire sprinkler fitting which avoids the aforementioned in the prior art.

SUMMARY

The invention satisfies this need. The invention is a pipe fitting useable in the installation of a sprinkler head. The pipe fitting comprises (a) a body having an open upstream end and an open downstream end, the downstream end having internal threads capable of accepting a threaded male fitting, the body defining a gasket retention area located upstream of the internal threads; and (b) a gasket disposed within the gasket retention area. In the invention, the gasket retention area and the gasket are chosen so that a threaded male fitting, when threadedly disposed within the downstream end of the body, is capable of contacting a short side of the gasket with the fitting edge so as to laterally distort the gasket inwardly, such that the threaded male fitting can be rotated within the downstream end of the body 360° while remaining liquid tight for pressures in excess of 300 psig.

DRAWINGS

These and other features, aspects and advantages of the present invention will become better understood with reference to the following description, appended claims and accompanying drawings where:

FIG. 1 is an exploded perspective view of a fire sprinkler fitting having features of the invention;

FIG. 2 is a plan view of a gasket useable in the invention;

FIG. 3 is a cross-sectional view of the gasket illustrated in FIG. 2;

Figure 7:
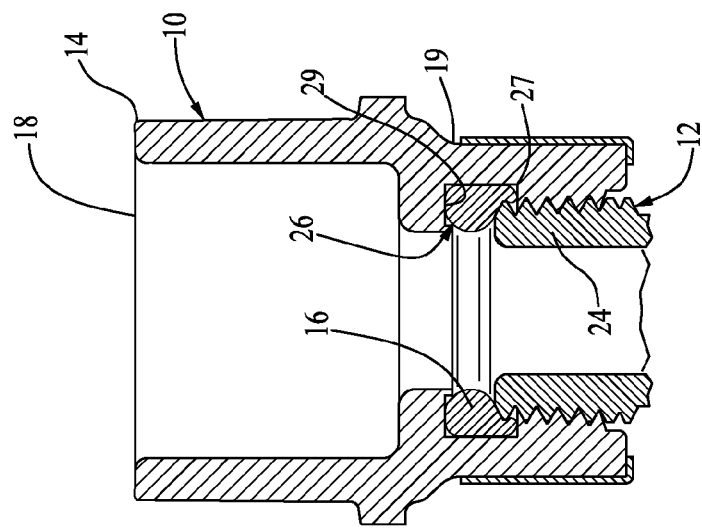
FIG. 7 is a partial cross-section of a fire sprinkler within the fitting illustrated in FIG. 1 showing the fire sprinkler initially threaded into the fitting.
Figure 8:
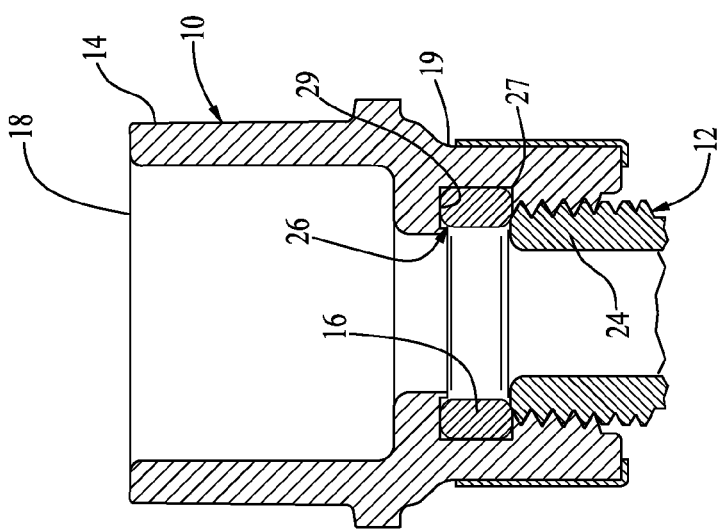
Figure 9:
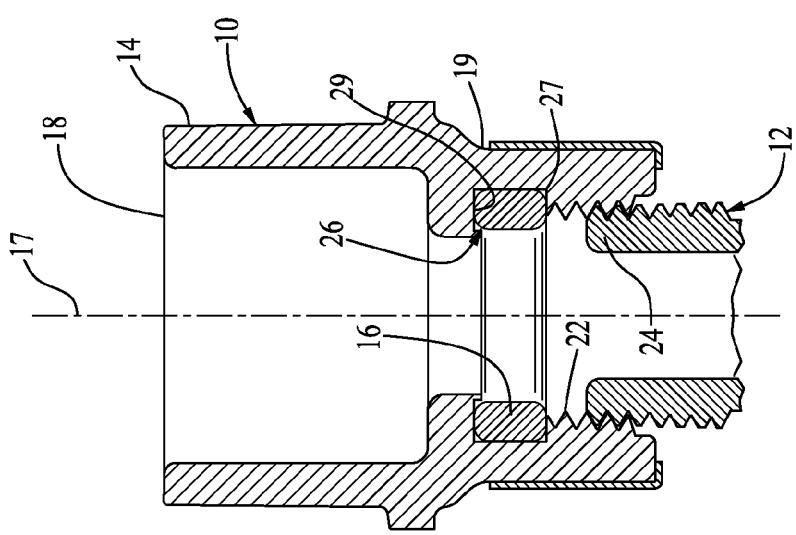

FIG. 8 is a partial cross-section of the combination illustrated in FIG. 7 taken along line 5-5, but showing the fire sprinkler fluid tight within the gasket within the fitting; and FIG. 9 is a partial cross-section of the fire sprinkler and fitting combination illustrated in FIG. 7 taken along line 6-6, but showing the fire sprinkler further rotated within the fitting, while remaining fluid tight against the gasket.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a pipe fitting 10 which can be advantageously used in the installation of a fire sprinkler head 12. The pipe fitting 10 of the invention comprises a body 14 and an elongated gasket 16.

FIGS. 1 and 4-6 are perspective views of the body 14 in one embodiment of the invention. FIGS. 7-9 illustrate the body 14 in cross-section. The body 14 is typically made from cast iron, steel, copper or brass. Other materials can also be used, such as cross-linked polyethylene having metallic thread inserts.

The body 14 has a circular cross-section and a longitudinal axis 17. The body 14 also has side walls 19, an open upstream end 18 and an open downstream end 20. The open downstream end 20 is sized and dimensioned to axially accept and retain an open pipe end. The downstream end 20 has internal threads 22 capable of accepting a male fitting 24 having external male threads which terminate at a fitting end edge 32, such as the threaded male fitting 24 of the fire sprinkler head 12. Typically, such internal threads 22 are a ½-14 NPT conforming to ASTM standard F1498, with the exception that the pitch diameter is at the end to oversize. Tolerance for fit with a threaded plug gauge is +/−1½ turns these threads are made to approximately 2 turns.

The body 14 defines a gasket retention area 26 located upstream of the internal threads 22. The gasket retention area 26 is provided by a circumferential notch 27 defined in the side walls 19 of the body 14, and comprises a flat gasket retention area base surface 29 disposed in a plane perpendicular to the longitudinal axis 17 of the body. The gasket retention area 26 is sized and dimensioned to wholly accept and retain the gasket 16 both when the gasket 16 is non-compressed and when the gasket 16 is fully compressed. The gasket retention area 26 is thus sized and dimensioned such that the gasket 16 is never allowed to escape from the gasket retention area 26 into the throat of the body 14.

The gasket 16 is disposed within the gasket retention area 26. Both the gasket 16 and the gasket retention area 26 are chosen so that a threaded male fitting 24 threadedly disposed within the downstream end 20 of the body 14 can be rotated within the downstream end 20 of the body 14 360° (one complete rotation) while remaining continuously fluid tight for pressures in excess for 300 psig, preferably in excess of 600 psig, more preferably in excess of 850 psig and most preferably in excess of 875 psig.

Typically, the gasket 16 is made from an elastomeric material. Many known elastomeric materials can be used in the gasket 16 such as EPDM, neoprene, silicone, buna-N, Hypalon, polyurethane, Santoprene, vinyl and Viton.

As best illustrated in FIGS. 2 and 3, the gasket 16 has a non-round cross-section with a pair of opposed long sides 28, a pair of opposed short sides 30, a longitudinal axis and a transverse axis. The length $l_1$ of the gasket cross-section, measured along the longitudinal axis, is typically between about 0.25 inches and about 0.3 inches for a gasket 16 having an internal diameter between about 0.5 inches and about 0.7 inches. The cross-section of the gasket 16 also has a width $l_2$, measured along the length of the traverse axis. Typically, $l_2$ is between about 0.13 inches and about 0.15 inches for a gasket 16 having an internal diameter between about 0.5 inches and about 0.7 inches.

In one typical embodiment, the gasket 16 has an inside diameter of about 0.61 inches, a length $l_1$ of about 0.27 inches and a width $l_2$ of about 0.139 inches.

It is typical in all embodiments that the ratio $l_2/l_1$ is typically between about 0.4 and about 0.6.

Figure 6:
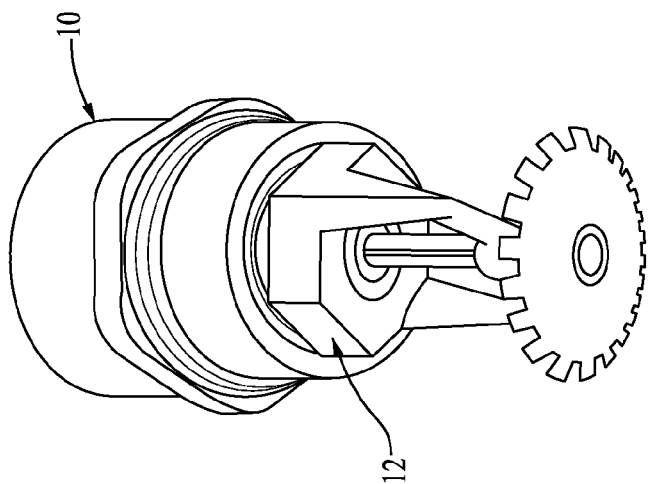
FIG. 6 illustrates the combination illustrated in FIG. 5, but showing the fire sprinkler further rotated within the fitting for proper final alignment.
Figure 5:
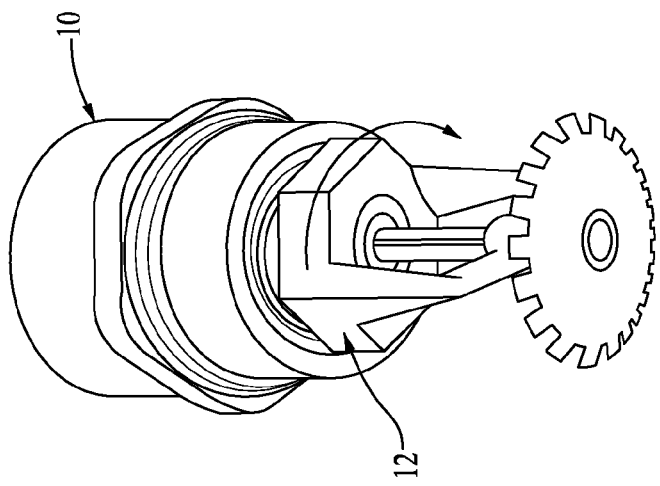
FIG. 5 illustrates the combination of a fire sprinkler and the fitting illustrated in FIG. 1 showing the additional tightening of the fire sprinkler within the fitting.
Figure 4:
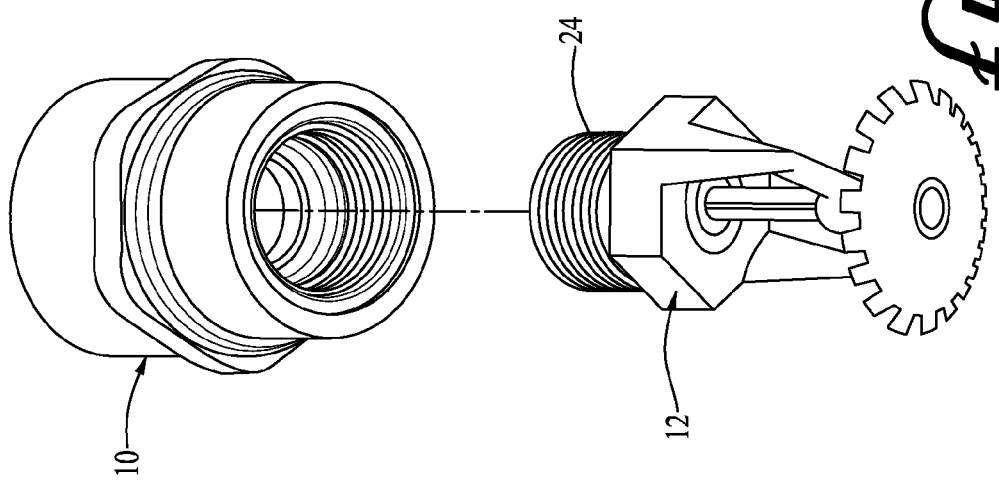
FIG. 4 is an exploded perspective view illustrating the installation of a fire sprinkler into the fitting illustrated in FIG. 1.

In operation, the gasket 16 is disposed within the gasket retention area 26 of the body 14 as illustrated, for example, in FIG. 7. Next, a fire sprinkler head 12 can be disposed within the downstream end 20 of the body 14. FIGS. 4 and 7 illustrate the initial sequence of threadily disposing the fire sprinkler head 12 into the downstream end 20 of the body 14.

Next, the fire sprinkler head 12 is threaded further into the body 14 until the fitting end edge 32 on the upstream end 18 of the fire sprinkler head 12 contacts a short side 30 of the gasket 16 and sufficiently presses against a short side 30 of the gasket 16 to effect a liquid tight seal with the gasket 16.

Lastly, the sprinkler head is rotated for up to 360° until it is in proper orientation. During this rotation, the sprinkler head 12 and the gasket 16 maintain a liquid tight seal. As noted above, this liquid tight seal can preferably withstand in excess of 300 psig, more preferably in excess of 600 psig, still more preferably in excess of 850 psig and most preferably in excess of 875 psig.

The invention thus provides the installer of fire sprinklers an easy, economical and quick way to install and properly align fire sprinklers.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A pipe fitting useable in the installation of a fire sprinkler head, the pipe fitting comprising:
   (a) a plastic body having a circular cross-section, a longitudinal axis, side walls, an open upstream end and an open downstream end, the open downstream end being sized and dimensioned to axially accept and retain an open pipe end, the downstream end having internal threads capable of accepting a male fitting having external threads which terminate at a fitting end edge, the body defining a gasket retention area located upstream of the internal threads; and
   (b) an elongated gasket disposed within the gasket retention area, the elongated gasket having a pair of opposed long sides and a pair of opposed short sides, the gasket retention area comprising a circumferential notch defined in the side walls of the body and a flat gasket retention area base disposed in a plane perpendicular to the longitudinal axis of the body;
   wherein the gasket retention area and the gasket are chosen so that said male fitting, when threadedly disposed within the upstream end of the body, is capable of contacting a short side of the gasket with the fitting end edge so as to laterally distort the gasket inwardly, such that the threaded male fitting can be rotated within the downstream end of the body 360° while remaining liquid tight for pressures in excess of 300 psig.

2. The pipe fitting of claim 1 wherein the gasket is made from an elastomeric material.

3. The pipe fitting of claim 1 wherein the gasket is made from an elastomeric material chosen from the group of elastomeric materials consisting of EPDM, neoprene, silicone, buna-N, Hypalon, polyurethane, Santoprene, vinyl and Viton.

4. The pipe fitting of claim 1 wherein the gasket is made from EPDM.

5. The pipe fitting of claim 1 wherein the gasket has a non-round cross-section having a longitudinal axis and a traverse axis, the length $l_1$ of the gasket cross-section measured along the longitudinal axis being between about 0.25 inches and 0.3 inches.

6. The pipe fitting of claim 5 wherein the cross-section of the gasket has a width $l_2$ measured along the length of the transverse axis which is between about 0.13 inches and 0.15 inches.

7. The pipe fitting of claim 6 wherein the ratio of $l_2/l_1$ is about 0.4 and about 0.6.

8. The pipe fitting of claim 1 wherein the gasket has an internal diameter between about 0.5 inches and about 0.7 inches.

9. The pipe fitting of claim 1 wherein the gasket retention area and the gasket are chosen so that a threaded male fitting threadedly disposed within the downstream end of the body can be rotated within the downstream end of the body 360° while remaining fluid tight for pressures in excess of 600 psig.

10. The pipe fitting of claim 1 wherein the gasket retention area and the gasket are chosen so that a threaded male fitting threadedly disposed within the downstream end of the body can be rotated within the downstream end of the body 360° while remaining liquid tight for pressures in excess of 850 psig.

11. The pipe fitting of claim 1 wherein a fire sprinkler is retained within the downstream end of the body.

* * * * *